United States Patent
Wake

(10) Patent No.: US 7,292,016 B2
(45) Date of Patent: Nov. 6, 2007

(54) BUCK/BOOST DC-DC CONVERTER CONTROL CIRCUIT WITH INPUT VOLTAGE DETECTION

(75) Inventor: Hiroki Wake, Chiba (JP)

(73) Assignee: Seiko Instruments Inc. (JP)

( * ) Notice: Subject to any disclaimer, the term of this patent is extended or adjusted under 35 U.S.C. 154(b) by 73 days.

(21) Appl. No.: 10/888,678

(22) Filed: Jul. 9, 2004

(65) Prior Publication Data
US 2005/0007080 A1    Jan. 13, 2005

(30) Foreign Application Priority Data
Jul. 11, 2003  (JP)  ............................. 2003-195466
Jul. 5, 2004   (JP)  ............................. 2004-198544

(51) Int. Cl.
*G05F 1/59*    (2006.01)
(52) U.S. Cl. ...................... 323/271; 323/222; 323/284; 323/285; 323/299
(58) Field of Classification Search ................ 323/222, 323/271, 282, 284, 285, 299
See application file for complete search history.

(56) References Cited

U.S. PATENT DOCUMENTS

| | | | | |
|---|---|---|---|---|
| 4,161,023 A | * | 7/1979  | Goffeau ......................... 363/124 |
| 4,618,812 A | * | 10/1986 | Kawakami .................... 323/224 |
| 4,814,685 A | * | 3/1989  | Renger ......................... 323/224 |
| 4,964,029 A | * | 10/1990 | Severinsky et al. ........... 363/80 |
| 4,967,138 A | * | 10/1990 | Obergfell et al. ............ 323/224 |
| 5,422,562 A | * | 6/1995  | Mammano et al. ......... 323/282 |
| 5,583,422 A | * | 12/1996 | Schirmer et al. ............ 323/224 |
| 6,037,755 A | * | 3/2000  | Mao et al. ................... 323/222 |
| 6,348,779 B1 | * | 2/2002 | Sluijs .......................... 323/222 |
| 6,737,838 B2 | * | 5/2004 | Sluijs et al. ................. 323/225 |

* cited by examiner

*Primary Examiner*—Jeffrey Sterrett
(74) *Attorney, Agent, or Firm*—Adams & Wilks

(57) ABSTRACT

A semiconductor device has a DC-DC converter control circuit for selectively carrying out a boosting operation and a deboosting operation in accordance with a value of a power supply voltage supplied to the DC-DC converter control circuit and for outputting an activation pulse during a rise of the power supply voltage. The DC-DC converter control circuit has a voltage detection circuit for monitoring the power supply voltage to judge whether the DC-DC converter control circuit carries out the boosting operation or the deboosting operation. A control circuit controls the output of the activation pulse in accordance with an output signal from the voltage detection circuit and stops the output of the activation pulse when the voltage detection circuit judges that the DC-DC converter control circuit carries out the deboosting operation.

4 Claims, 4 Drawing Sheets

(a) RISE SEQUENCE OF DC-DC CONVERTER CONTROL CIRCUIT IN BOOSTING OPERATION (b) RISE SEQUENCE OF DC-DC CONVERTER CONTROL CIRCUIT IN DEBOOSTING OPERATION

BUCK/BOOST DC-DC CONVERTER CONTROL CIRCUIT WITH INPUT VOLTAGE DETECTION

BACKGROUND OF THE INVENTION

1. Field of the Invention

The present invention relates in general to an integrated semiconductor device including a DC-DC converter control circuit of a pulse width modulated (PWM) type which can operate at a low voltage and which outputs an output voltage used as a self-bias voltage as well, and more particularly to a switching regulator having a function for automatically changing a boosting operation and a deboosting operation over to each other.

2. Description of the Related Art

FIG. 3 shows a circuit diagram of a conventional switching regulator having a function for automatically changing a boosting operation and a deboosting operation over to each other.

The boosting/deboosting automatic changing function is a function for automatically changing a boosting operation and a deboosting operation over to each other based on a value of an input voltage to obtain a desired output voltage.

Hereinafter, this circuit will be described with reference to FIG. 3. A DC-DC converter control circuit includes a bleeder resistor circuit 206, a reference voltage circuit 201, an error amplifier 204, a circuit 205 for shifting an output voltage of the error amplifier 204, a triangular wave oscillator 202, PWM comparator circuits 207 and 208, an activation oscillator 203, change-over switches 209 and 210, and output buffer circuits 211 and 212.

The bleeder resistor circuit 206 outputs a voltage which is obtained by dividing an output voltage VOUT of the switching regulator by a resistance ratio, The reference voltage circuit 201 is a reference voltage source for outputting a constant voltage of 1 V, for instance.

The error amplifier 204 outputs a voltage which is determined based on an electrical potential difference between the voltage of the reference voltage circuit 201 and the voltage obtained through the resistance ratio division with the bleeder resistors.

The error amplifier output voltage shifting circuit 205 outputs a voltage which is obtained by shifting an output voltage of the error amplifier 204. For this shift width, in general, there is adopted a method including shifting a voltage for an amplitude of a triangular wave signal of the triangular wave oscillator 202.

The PWM comparator circuit 207 compares the output of the triangular wave oscillator 202 with the output of the error amplifier 204 to thereby output a PWM control signal 221.

The PWM comparator circuit 208 compares the output of the triangular wave oscillator 202 with the output of the error amplifier output voltage shifting circuit 205 to thereby output a PWM control signal 222.

The activation oscillator 203 is an oscillator which can operate at a low power supply voltage of 1 V, for instance, and outputs an activation pulse 220.

The change-over switch 209 changes the PWM control signal 221 and the GND electric potential over to each other to output a driving signal 223 used to drive a P-channel MOSFET 213 through the output buffer circuit 211.

The change-over switch 210 changes the PWM control signal 222 and the activation pulse 220 over to each other to output a driving signal 224 used to drive an N-channel MOSFET 216 through the output buffer circuit 212.

The change-over switches 209 and 210 are circuits for, when the PWM control signals 221 and 222 have a voltage, equal to or larger than 2 V for example, enough for the switching regulator to normally operate, carrying out the change-over operation so as to output the PWM control signals 221 and 222, respectively.

When the PWM control signals 221 and 222 have a voltage not reaching a voltage enough for the switching regulator to normally operate, the circuits such as the error amplifier 204, the error amplifier output voltage shifting circuit 205, the triangular wave oscillator 202, and the PWM comparator circuits 207 and 208 can not normally operate. As a result, it is impossible to obtain the PWM signal which is to be essentially obtained. In such a case, the change-over switches 209 and 210 change the PWM control signals 221 and 222 over to the GND electric potential and the activation pulse 220 to output the GND electric potential and the activation pulse 220, respectively.

A boosting/deboosting automatic change-over switching regulator circuit includes the DC-DC converter control circuit, the P-channel MOSFET 213, a chopper coil 214, the N-channel MOSFET 216, Schottky barrier diodes 215 and 217, and a capacitor 218, and hence enables the boosting/deboosting automatic change-over operation.

When the low voltage driving is realized using the DC-DC converter control circuit having a plurality of channel outputs, it is effective that the circuit configuration as described above is adopted, and further that the output voltage VOUT of the switching regulator is used for a self-bias.

FIGS. 4A and 4B are timing charts explaining an operation sequence of the conventional DC-DC converter control circuit.

FIG. 4A shows a rise sequence of the DC-DC converter control circuit in the boosting operation. The boosting operation is an operation when a power supply voltage VDD of the switching regulator circuit is equal to or lower than a desired output voltage.

When the output voltage VOUT after the power supply voltage is applied is low, the change-over switches 209 and 210 are made to change sides over to activation sides to thereby output the GND electric potential and the activation pulse to a P-channel MOSFET drive terminal (hereinafter referred to as "a PDRV terminal" for short) 223 and an N-channel MOSFET drive terminal (hereinafter referred to as "a NDRV terminal" for short) 224, respectively. At this time, the switching regulator circuit carries out the boosting operation in accordance with the activation pulse to boost the output voltage VOUT. Thereafter, when the output voltage VOUT becomes a voltage at which the stable operation becomes possible, the change-over switches are made to carry out the change-over operation so as to output the PWM control signals, respectively, so that the operation becomes the normal PWM operation.

FIG. 4B shows a rise sequence of the DC-DC converter control circuit in the deboosting operation. The deboosting operation is an operation when the power supply voltage VDD of the switching regulator circuit is equal to or larger than the desired output voltage.

As in the boosting operation, when the output voltage VOUT after the power supply voltage is applied is low, the change-over switches 209 and 210 are made to change sides over to activation sides to thereby output the GND electric potential and the activation pulse to the PDRV terminal and the NDRV terminal, respectively. At this time, the switching regulator circuit carries out the boosting operation in accordance with the activation pulse to boost the output voltage VOUT. Thereafter, when the output voltage VOUT becomes a voltage at which the stable operation becomes possible, the change-over switches are made to carry out the change-over operation so as to output the PWM control signals, respectively, so that the operation becomes the normal PWM operation.

As described above, at the rise of the power supply voltage, the boosting output signal is changed from the activation pulse signal over to the PWM control signal as the output voltage VOUT increases from the low voltage to the voltage at which the stable operation can be carried out. Since the pulse signal corresponding to the output voltage VOUT is outputted using the PWM control signal, the output voltage VOUT becomes stable at a desired output voltage value (refer to JP 2002-233138 A (FIG. 11)).

However, the activation pulse signal is a pulse signal having a fixed waveform, and hence is not a pulse signal corresponding to the output voltage VOUT. Thus, the output voltage maybe unstable depending on the loads.

In case of an overload, it is conceivable that a time period required to carry out the boosting operation becomes longer, or no boosting operation is carried out. On the other hand, in case of a light load, it is conceivable that a time period required to carry out the boosting operation becomes shorter, and hence a ripple becomes large when the change-over operation is carried out so as to output the PWM control signals.

SUMMARY OF THE INVENTION

The present invention has been made in order to solve the above-mentioned problems associated with the related art, and it is, therefore, an object of the present invention to provide a boosting/deboosting automatic change-over switching regulator which is capable of stably operating even during a rise of a power supply voltage.

In order to attain the above-mentioned object, according to the present invention, a power supply detection circuit for monitoring a power supply voltage is provided in a DC-DC converter control circuit constituting a boosting/deboosting automatic change-over switching regulator. The power supply voltage detection circuit is configured so as to detect based on the monitored power supply voltage and a desired output voltage value whether an operation of the DC-DC converter control circuit is a boosting operation or a deboosting operation. Then, a rise sequence of a power supply voltage of the DC-DC converter control circuit is controlled in accordance with an output signal of the power supply detection circuit.

In the DC-DC converter control circuit of the present invention, when the power supply voltage is equal to or larger than a desired output voltage in turning ON the power supply, the boosting operation based on an activation pulse is not carried out, and the output voltage can be boosted so as to reach a stable operation region of a PWM control output. Consequently, the output voltage can be positively boosted irrespective of a load imposed on the switching regulator output.

DETAILED DESCRIPTION OF THE PREFERRED EMBODIMENT

Figure 1:
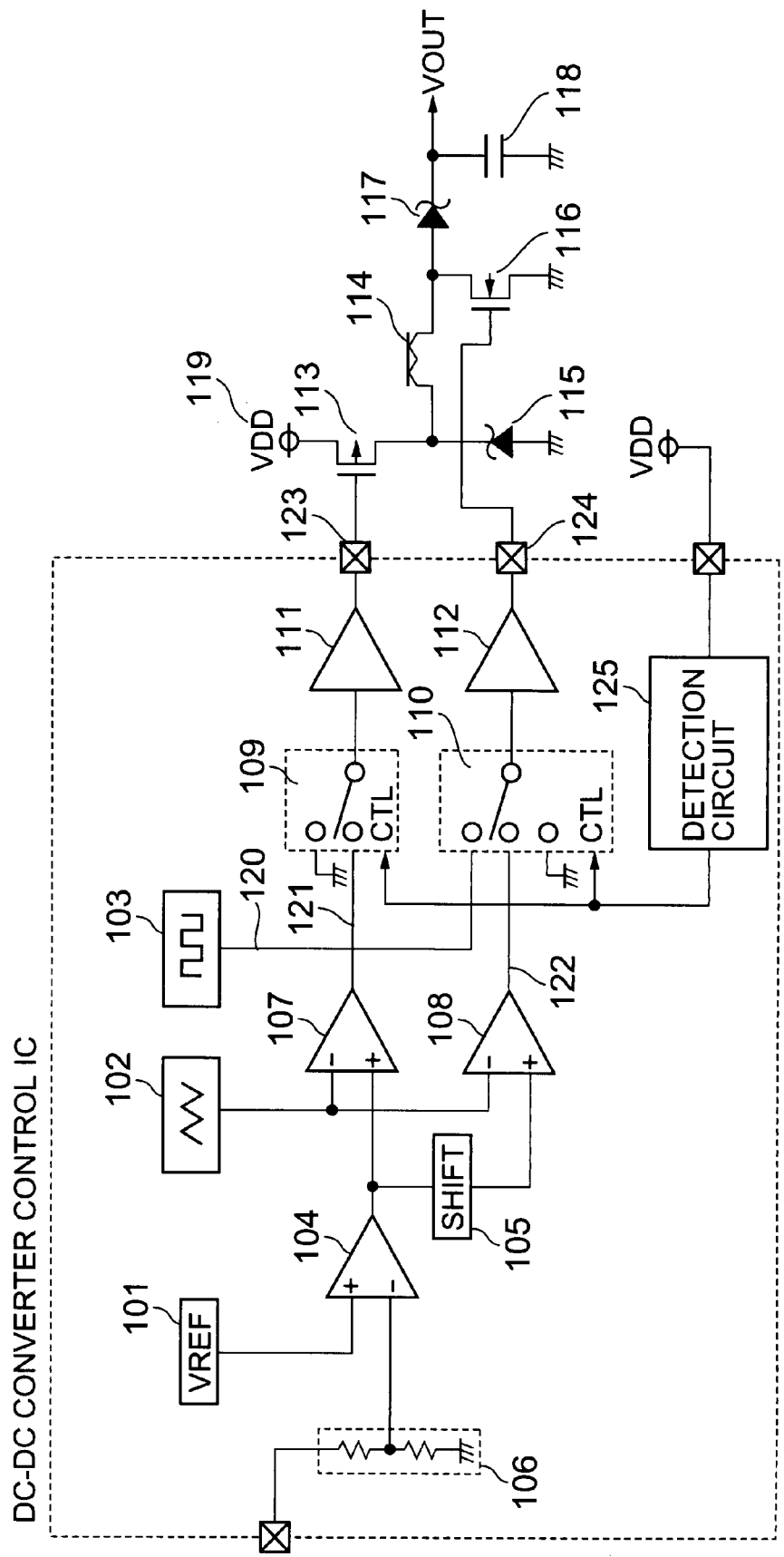
FIG. 1 is a circuit diagram of a switching regulator according to an embodiment of the present invention.

FIG. 1 is a circuit diagram of a switching regulator according to an embodiment of the present invention.

A DC-DC converter control circuit includes a bleeder resistor circuit 106, a reference voltage circuit 101, an error amplifier 104, a circuit 105 for shifting an output voltage of the error amplifier 104, a triangular wave oscillator 102, PWM comparators 107 and 108, an activation oscillator 103, change-over switches 109 and 110, output buffer circuits 111 and 112, and a power supply detection circuit 125. The power supply detection circuit 125 is a circuit for monitoring a power supply voltage VDD to identify whether the power supply voltage VDD is higher or lower than a desired output voltage.

The bleeder resistor circuit 106 outputs a voltage which is obtained by dividing an output voltage VOUT by a resistance ratio. The bleeder resistor circuit 106 may be of a self-contained type or of an outside type with respect to the DC-DC converter control circuit. The reference voltage circuit 101 is a reference voltage source for outputting a constant voltage of 1 V, for example.

The error amplifier 104 outputs a voltage determined based on an electric potential difference between a voltage of the reference voltage circuit 101 and the voltage which is obtained through the resistance ratio division in the bleeder resistor circuit 106.

The error amplifier output voltage shifting circuit 105 outputs a voltage which is obtained by shifting the output voltage of the error amplifier 104. For this shift width, in general, there is adopted a method including shifting a voltage for an amplitude of a triangular wave signal of the triangular wave oscillator 102.

The PWM comparator circuit 107 compares the output of the triangular wave oscillator 102 with the output of the error amplifier 104 to thereby output a PWM control signal 121.

The PWM comparator circuit 108 compares the output of the triangular wave oscillator 102 with the output of the error amplifier voltage shifting circuit 105 to thereby output a PWM control signal 122.

The activation oscillator 103 is an oscillator circuit which can operate at a low power supply voltage of 1 V, for example, and outputs an activation pulse 120.

The change-over switch 109 changes the PWM control signal 121 and the GND electric potential over to each other to output a driving signal 123 used to drive a P-channel MOSFET 113 through an output buffer circuit 111. The change-over switch 110 changes the PWM control signal 122 and the activation pulse 120 over to each other to output a driving signal 124 used to drive an N-channel MOSFET 116 through an output buffer circuit 112.

Each of the change-over switches 109 and 110 is controlled in accordance with an output signal from the power supply detection circuit 125. The change-over switches 109 and 110 are circuits for, when the PWM control signals 121 and 122 have a voltage, equal to or larger than 2 V for example, enough for the switching regulator to normally operate, carrying out the change-over operations so as to output the PWM control signals 121 and 122, respectively.

When the PWM control signals 121 and 122 have a voltage not reaching a voltage enough for the switching regulator to normally operate, the circuits such as the error amplifier 104, the error amplifier output voltage shifting circuit 105, the triangular wave oscillator 102 and the PWM comparator circuits 107 and 108 can not normally operate. As a result, it is impossible to obtain a the PWM signals which are to be essentially obtained. In such a case, the change-over switches 109 and 110 change the PWM control signals 121 and 122 over to the GND electric potential and the activation pulse 120 to output the GND electric potential and the activation pulse 120, respectively.

The boosting/deboosting automatic change-over switching regulator circuit includes the DC-DC converter control circuit, the P-channel MOSFET 113, a chopper coil 114, the N-channel MOSFET 116, Schottky barrier diodes 115 and 117, and a capacitor 118, and hence enables the boosting/deboosting automatic change-over operation.

Figure 2:
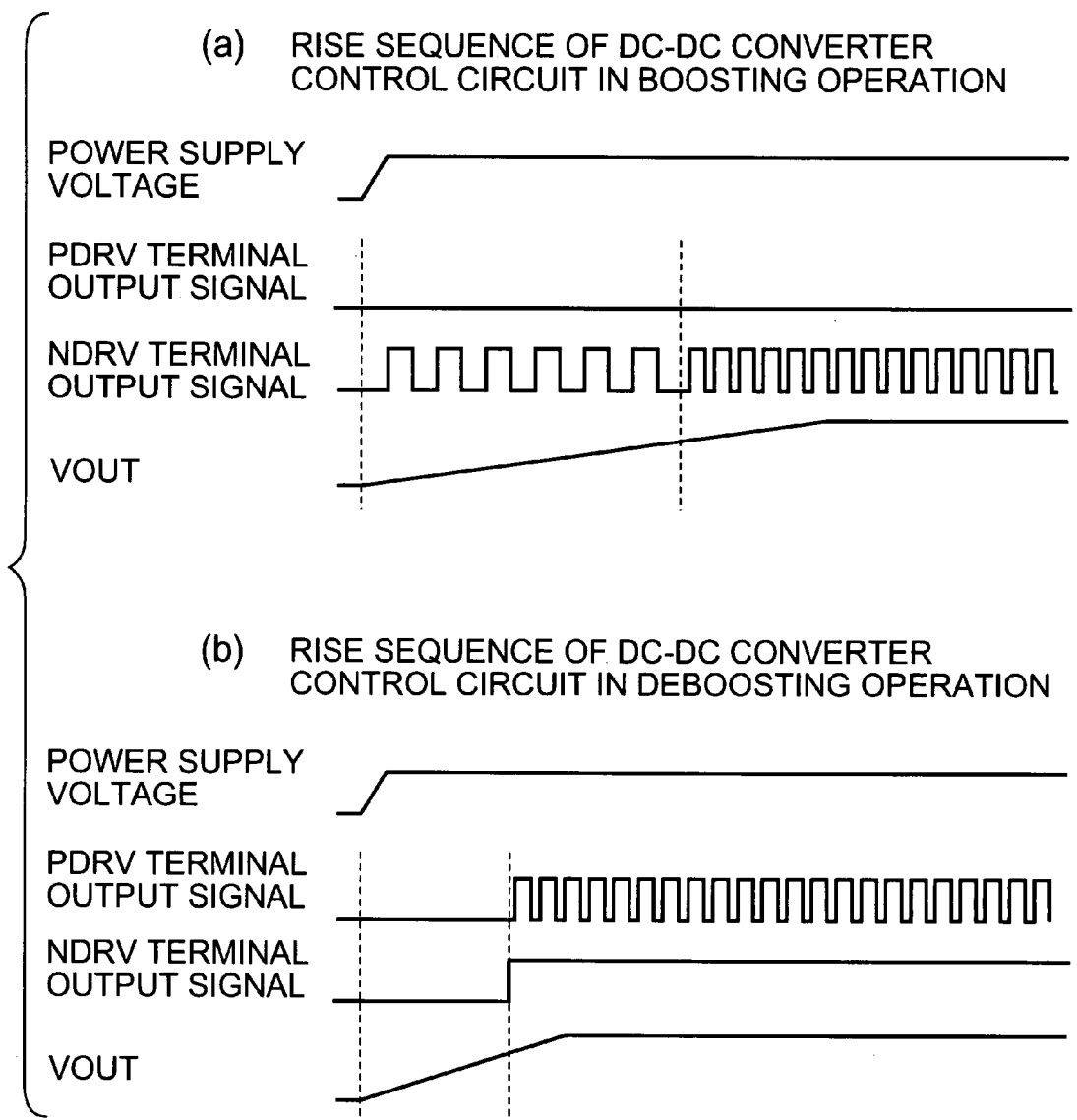
FIGS. 2A and 2B are timing charts explaining an operation sequence of the switching regulator according to the embodiment of the present invention.
Figure 3:
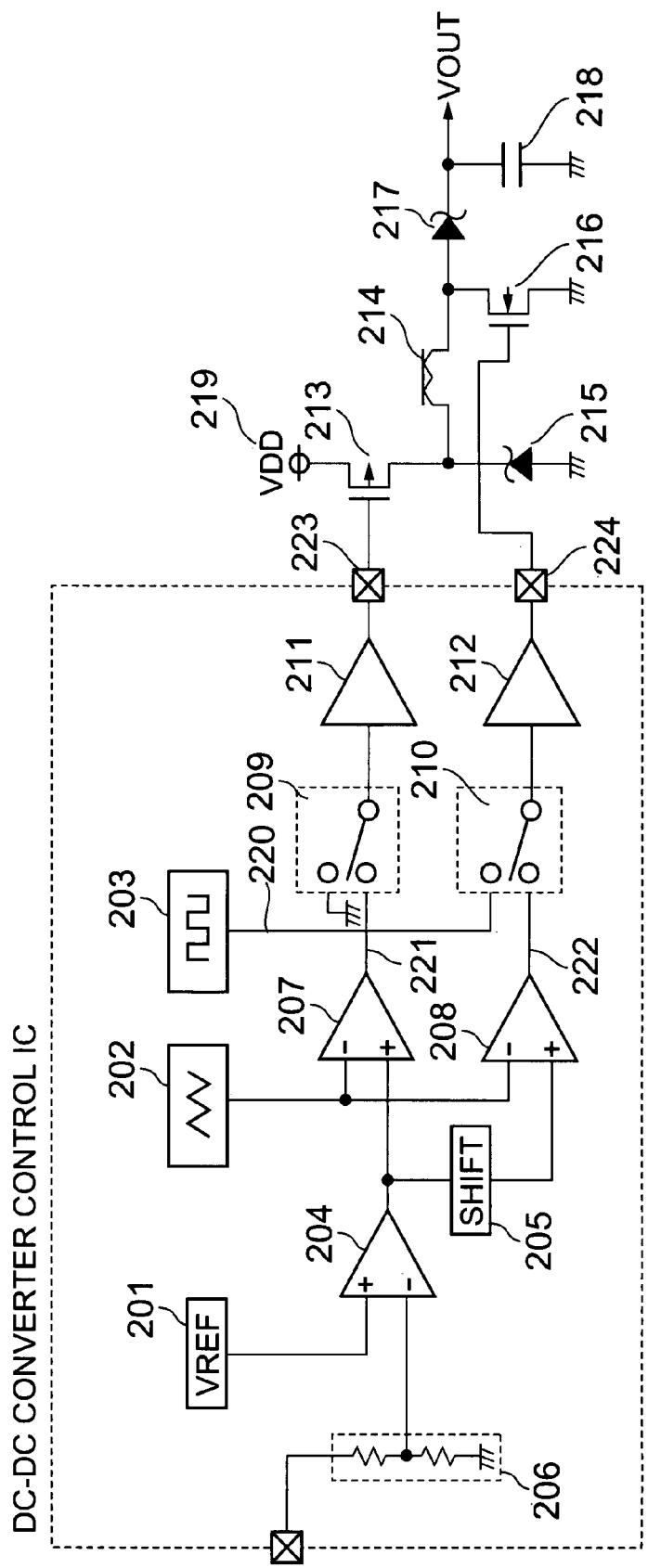
FIG. 3 is a circuit diagram, partly in block diagram, of a switching regulator according to a related art example.
Figure 4:
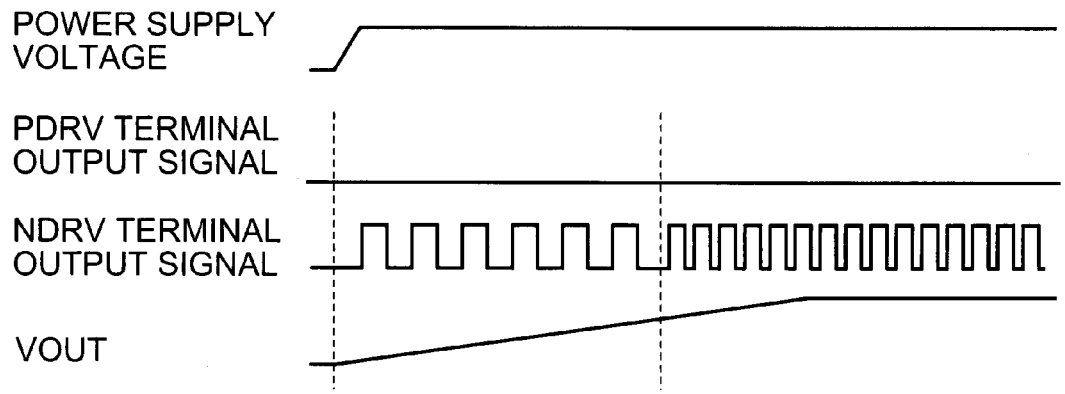
FIGS. 4A and 4B are timing charts explaining an operation sequence of the switching regulator according to the related art example.
Figure 4:
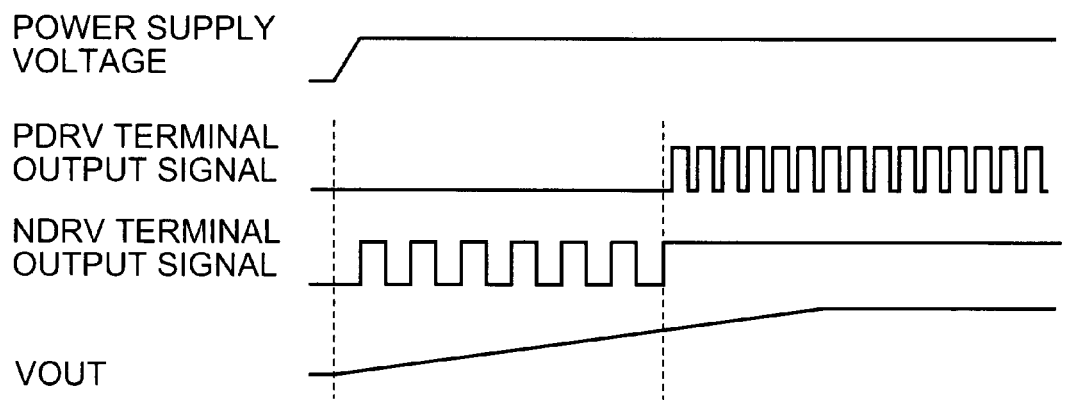

FIGS. 2A and 2B are timing charts explaining an operation sequence of the switching regulator according to the embodiment of the present invention.

FIG. 2A shows a rise sequence of the DC-DC converter control circuit in the boosting operation. The boosting operation is an operation when the power supply voltage VDD of the switching regulator circuit is equal to or lower than a desired output voltage.

When the output voltage VOUT after the power supply voltage is applied is low, the change-over switches 109 and 110 are made to change sides over to activation sides to thereby output the GND electric potential and the activation pulse to a P-channel MOSFET drive terminal (hereinafter referred to as "a PDRV terminal" for short) 123 and an N-channel MOSFET drive terminal (hereinafter referred to as "a NDRV terminal" for short) 124, respectively. At this time, the switching regulator circuit carries out the boosting operation in accordance with the activation pulse to boost the output voltage VOUT. Thereafter, when the output voltage VOUT becomes a voltage at which the stable operation becomes possible, the change-over switches are made to carry out the change-over operation so as to output the PWM control signals, respectively, so that the operation becomes the normal PWM operation.

FIG. 2B shows a rise sequence of the DC-DC converter control circuit in the deboosting operation. The deboosting operation is an operation when the power supply voltage VDD of the switching regulator circuit is equal to or larger than the desired output voltage.

When the output voltage VOUT after the power supply voltage is applied is low, the change-over switches 109 and 110 are made to change sides over to activation sides to thereby output the GND electric potential to the PDRV terminal 123.

At this time, when the power supply detection circuit 125 judges that the power supply voltage VDD is equal to or larger than a desired output voltage, i.e., an operation is in a deboosting operation state, the change-over switch 110 is controlled so as not to output the activation pulse to the NDRV terminal, but to output the GND electric potential thereto. When the change-over switches 109 and 110 are controlled in such a manner, in the switching regulator circuit, the P-channel MOSFET 113 is turned ON, and the N-channel MOSFET 116 is turned OFF. As a result, the output voltage VOUT increases up to a desired output voltage.

Thereafter, when the output voltage VOUT becomes a voltage at which the stable operation becomes possible, the change-over switches are made to carry out the change-over operation so as to output the PWM control signals, respectively, so that the operation becomes the normal PWM operation.

What is claimed is:

1. A DC-DC converter control circuit for selectively carrying out a boosting operation and a deboosting operation in accordance with a value of a power supply voltage supplied to the DC-DC converter control circuit, the DC-DC converter control circuit comprising:

an error amplifier that compares an output voltage with a reference voltage;

a triangular wave oscillator that outputs a triangular pulse;

an activation oscillator that outputs an activation pulse;

a deboosting signal output circuit that generates a first switching signal in accordance with the triangular pulse and an output of the error amplifier, and that outputs the first switching signal when the power supply voltage is higher than a first voltage;

a boosting signal output circuit that generates a second switching signal in accordance with the triangular pulse and the output of the error amplifier, and that outputs the second switching signal when the power supply voltage is less than the first voltage or outputs the activation pulse after the power supply voltage is supplied to the DC-DC converter control circuit; and a power supply voltage detecting circuit that detects the power supply voltage and prevents the boosting signal output circuit from outputting the activation pulse after the power supply voltage is supplied to the DC-DC converter control circuit and the power supply voltage is higher than the first voltage.

2. A DC-DC converter control circuit according to claim 1; wherein the DC-DC converter control circuit comprises a pulse width modulated-type DC-DC converter control circuit.

3. A DC-DC converter control circuit comprising:

switching means for selectively carrying out a boosting operation and a deboosting operation in accordance with a value of a power supply voltage supplied to the DC-DC converter control circuit;

amplifying means for comparing an output voltage with a reference voltage;

first oscillating means for outputing a triangular pulse;

second oscillating means for outputing an activation pulse;

deboosting signal output means for generating a first switching signal in accordance with the triangular pulse and an output of the amplifying means, and for outputing the first switching signal when the power supply voltage is higher than a first voltage;

boosting signal output means for generating a second switching signal in accordance with the triangular pulse and the output of the amplifying means, and for outputing the second switching signal when the power supply voltage is less than the first voltage or outputing the activation pulse after the power supply voltage is supplied to the DC-DC converter control circuit; and power supply voltage detecting means for detecting the power supply voltage and preventing the boosting signal output means from outputting the activation pulse after the power supply voltage is supplied to the DC-DC converter control circuit and the power supply voltage is higher than the first voltage.

4. A DC-DC converter control circuit according to claim 3; wherein the DC-DC converter control circuit comprises a pulse width modulated-type DC-DC converter control circuit.

* * * * *